Dec. 12, 1967  J. N. IANUZZI ETAL  3,357,139
HELIXING MACHINE
Filed May 26, 1964  6 Sheets-Sheet 1
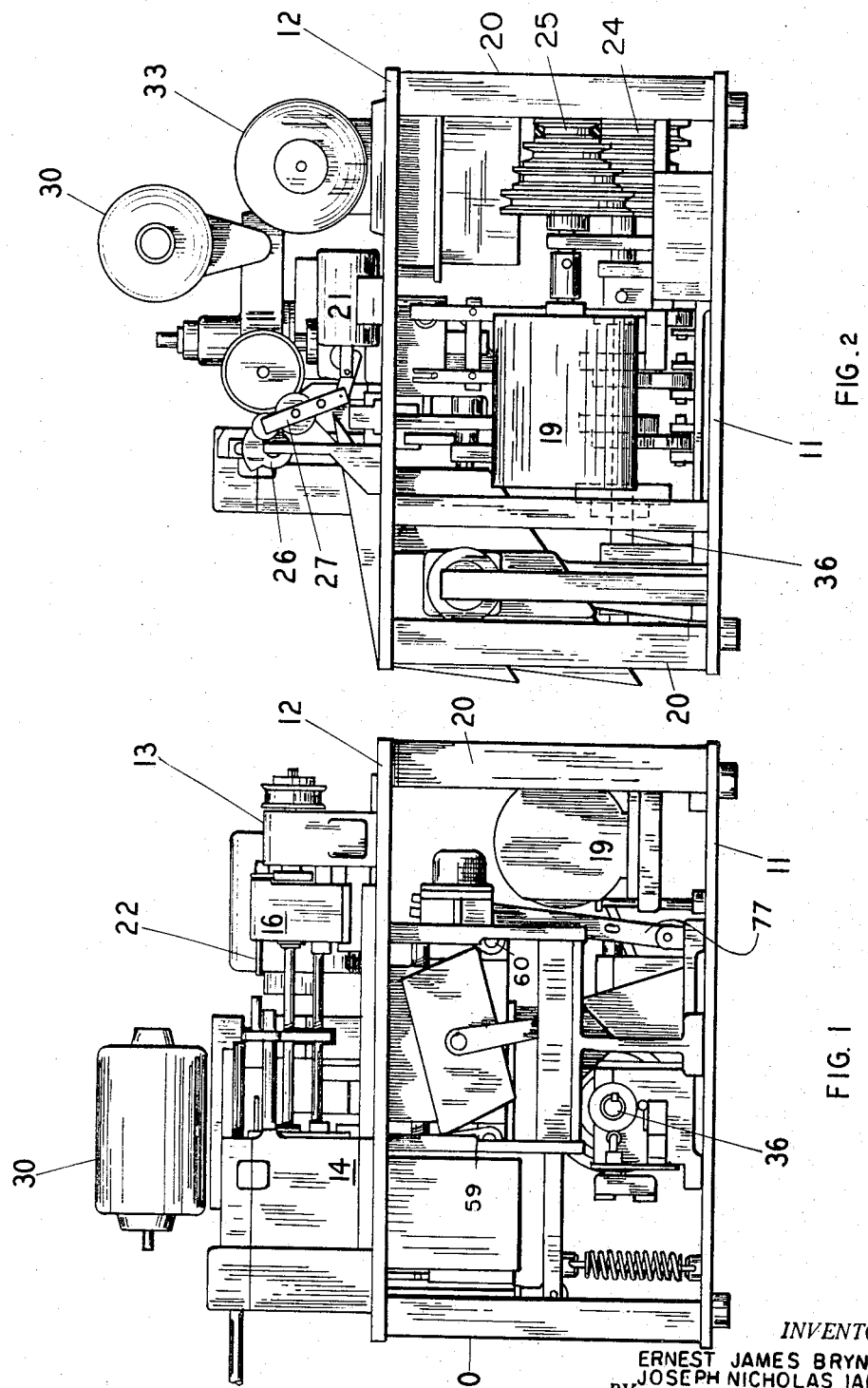
INVENTORS
ERNEST JAMES BRYNER
JOSEPH NICHOLAS IANUZZI
JERRY L. WIGHT
BY Charles L. Lauecheck
ATTORNEY Dec. 12, 1967  J. N. IANUZZI ETAL  3,357,139
HELIXING MACHINE Filed May 26, 1964  6 Sheets-Sheet 2

INVENTORS
ERNEST JAMES BRYNER
JOSEPH NICHOLAS IANUZZI
BY    JERRY L. WIGHT

Attorney

Dec. 12, 1967

J. N. IANUZZI ETAL 3,357,139

HELIXING MACHINE

Filed May 26, 1964

*INVENTORS*
ERNEST JAMES BRYNER
JOSEPH NICHOLAS IANUZZI
BY      JERRY L. WIGHT

*Charles L. Lovercheck*
*Attorney*

Dec. 12, 1967     J. N. IANUZZI ET AL     3,357,139
HELIXING MACHINE
Filed May 26, 1964     6 Sheets-Sheet 4
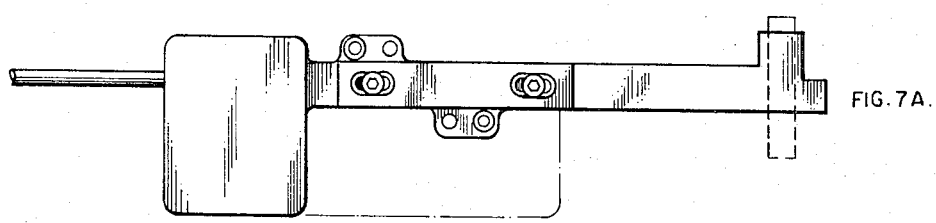
FIG. 7A.
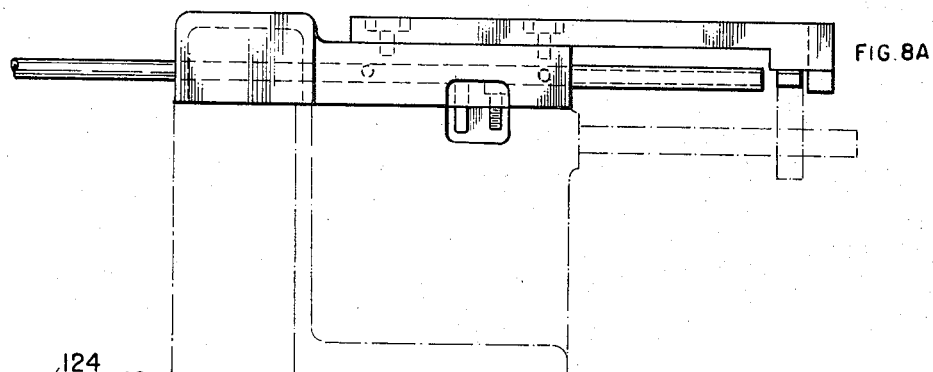
FIG. 8A.
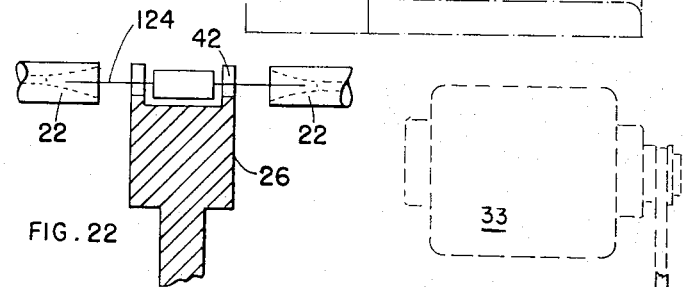
FIG. 22     FIG. 7
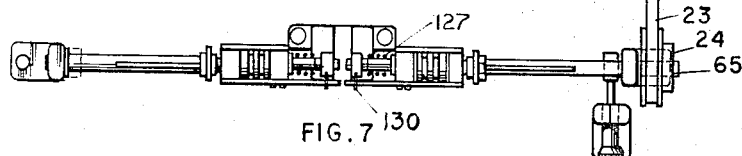
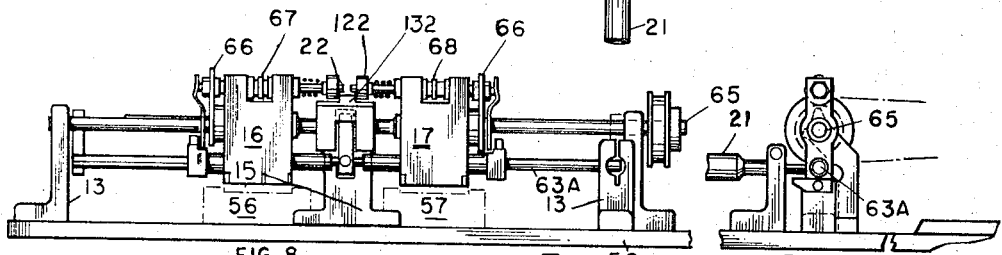
FIG. 8     FIG. 9
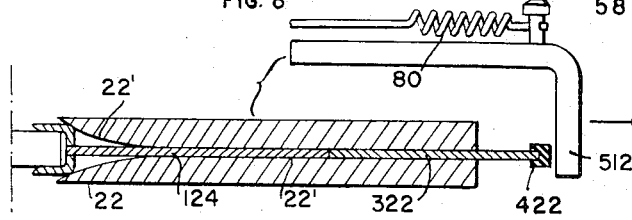
FIG. 19
INVENTORS
ERNEST JAMES BRYNER
JOSEPH NICHOLAS IANUZZI
JERRY L. WIGHT
BY
ATTORNEY Dec. 12, 1967  J. N. IANUZZI ETAL  3,357,139
HELIXING MACHINE Filed May 26, 1964  6 Sheets-Sheet 5

INVENTORS
ERNEST JAMES BRYNER
JOSEPH NICHOLAS IANUZZI
BY         JERRY L. WIGHT

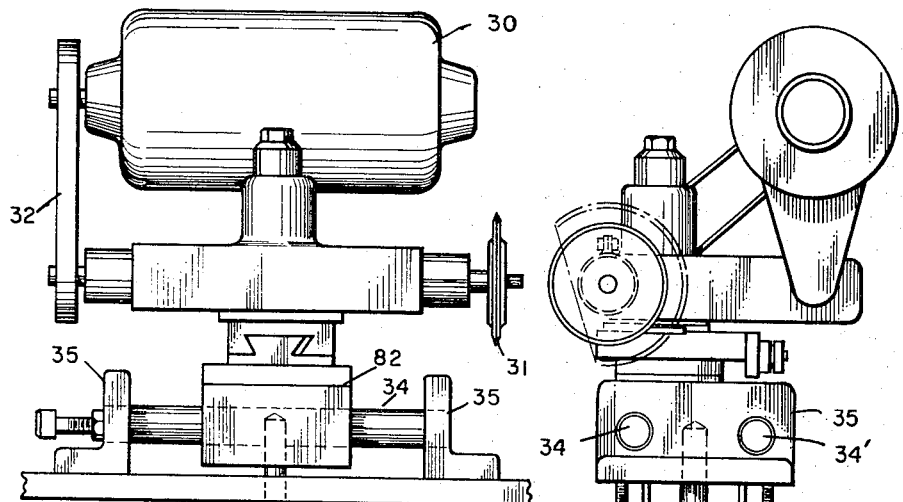
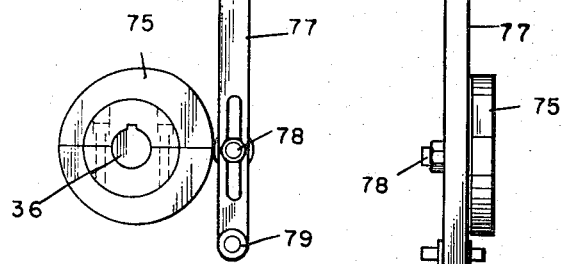
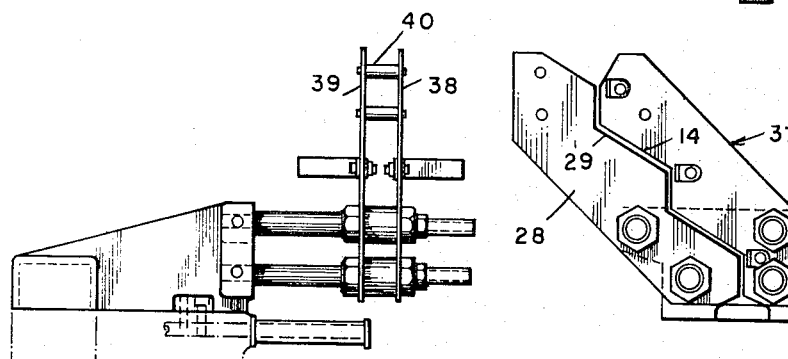

United States Patent Office 3,357,139
Patented Dec. 12, 1967

3,357,139
HELIXING MACHINE
Joseph Nicholas Ianuzzi, Ernest James Bryner, and Jerry L. Wight, Bradford, Pa., assignors to Sigma Engineering Service, Inc., Custer City, Pa., a corporation of Pennsylvania
Filed May 26, 1964, Ser. No. 370,179
4 Claims. (Cl. 51—50)

This invention relates to helixing machines and, more particularly, to machines for putting helixes on the surfaces of resistors.

The helixing machine disclosed herein processes film resistors in an operation commonly known as helixing, spiralling, or adjusting. In this operation, the length of current path through the resistor is reduced in area and lengthened. Thus, the resistance of the unit is raised from the blank or basic value of the unit to some desired higher value.

Generally, the resistor begins as a cylindrical core of porcelain or other non-conductive material. Over this, a conductive coating or film is deposited. There then exists a basic resistance between the ends of the cylinder (terminals). The resistance of the unit is usually quite low at this point; usually one thousand ohms or less, but can be slightly higher. Resistors, in the most common applications, are of higher values on the order of one thousand to ten million ohms. To obtain these values, the film on the resistor core is cut through in the manner of a screw thread or helix. The net effect of such a cut is to cause the electrical path between terminals to become longer and narrower, both of which result in a raising of resistance value. The core at this point appears to have a cut or scratch mark of very regular pitch wrapped helically around it. This cut or scratch mark need be only as deep as the film (which usually is on the order of .0002 inch) and have a width of approximately .002 inch. Generally, the cuts have a V-configuration and are .003 inch deep and .003 inch wide.

The resistance after helixing is usually required to be some very precise value. To accomplish this, the resistor is monitored by an electrical measuring circuit called a bridge during the helixing operation. As the helix is progressively cut into the core, its resistance begins to mount. When the bridge senses that the core being processed is at the desired value (which has been preset into the bridge), it automatically separates the cutter blade and the workpiece. This terminates the cutting action and leaves the resistor at the required value.

The helixing machine is unique in being free of electro-mechanical clutches, brakes, etc. and pneumatic devices such as air cylinders. The helixing machine is designed to be quickly changed over so as to process through the loader and the entire handling cycle both resistors with leads and resistors without leads.

The machine has the following features:

(a) taper grip chucks
(b) rotating pivot on spindle
(c) independent spindle speed for infinite pitch adjustment
(d) concurrent load-unload action
(e) quick change tooling design
(f) throw-away collets
(g) pantographic cutter travel linkage, uniform travel out of constant velocity cam with swinging arm
(h) spring loaded spindle mechanism with overtravel which makes possible mechanically programmed spindle motion with electrical (solenoid) override on signal
(i) low mass (electrically and mechanically in chuck and spindle mechanism) gives precision results in resistance The rotation of the spindles is caused by a speed controlled electric motor which is independent of any other speed in the machine, thus providing the ability to generate any desired helix pitch.

The cutter is a high speed spindle arrangement with its own motor and can only move transversely (axially) along the resistor. The electrical measuring probes are the spindle chucks themselves which are isolated from the machine frame and which have connections from them to the bridge circuit.

Previous machines did not have structure to carry out the functions set forth in a simple, efficient, and compact manner.

It is, accordingly, an object of the present invention to provide a machine for cutting helixes in the surfaces of resistors which is simple in construction, economical to manufacture, and simple and efficient in operation.

Another object of the invention is to provide an improved helixing machine.

A further object of the invention is to provide a helixing machine which will cut a helix in the surface of a resistor of proper size to give the resistor an overall desired resistance between precise limits.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

In the drawings:

FIG. 1 is a front view of a machine according to the invention shown with a lead type feed installed;

FIG. 2 is a side view of the machine shown in FIG. 1;

FIG. 7 is a top view of the spindle drive assembly;

FIG. 7A is a top view of the loader assembly;

FIG. 8 is a side view of the spindle drive assembly;

FIG. 8A is a side view of the loader assembly;

FIG. 9 is an end view of the spindle drive assembly

FIG. 14 is a side view of the cutter arrangement and drive motor;

FIG. 15 is an end view of the cutter arrangement shown in FIG. 14;

FIG. 19 is an enlarged partial cross sectional view of one of the chucks;

FIG. 20 is an enlarged side view of the loading mechanism;

FIG. 21 is an enlarged end view of the loading mechanism;

FIG. 22 is an enlarged view of the chucking mechanism.

Figure 4:
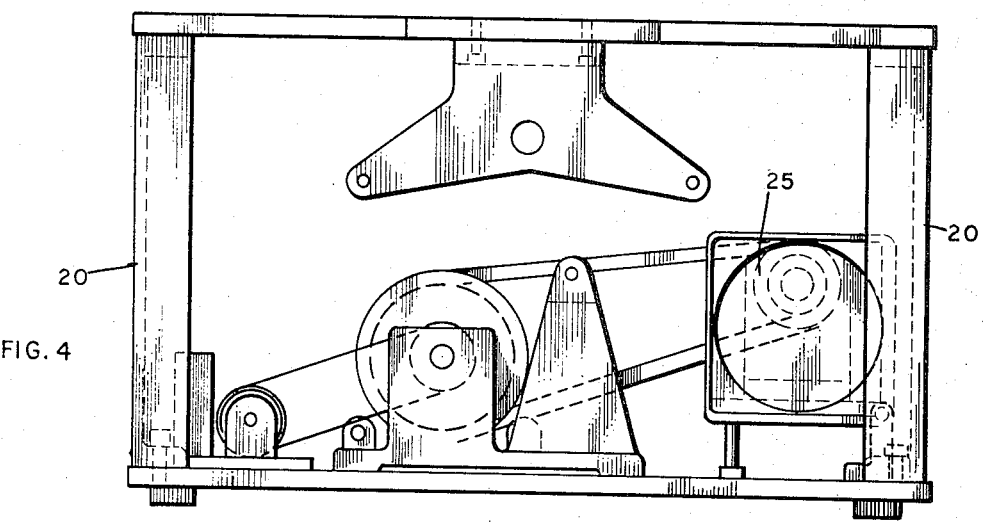
FIG. 4 is a side view of the machine with certain parts removed.
Figure 3:
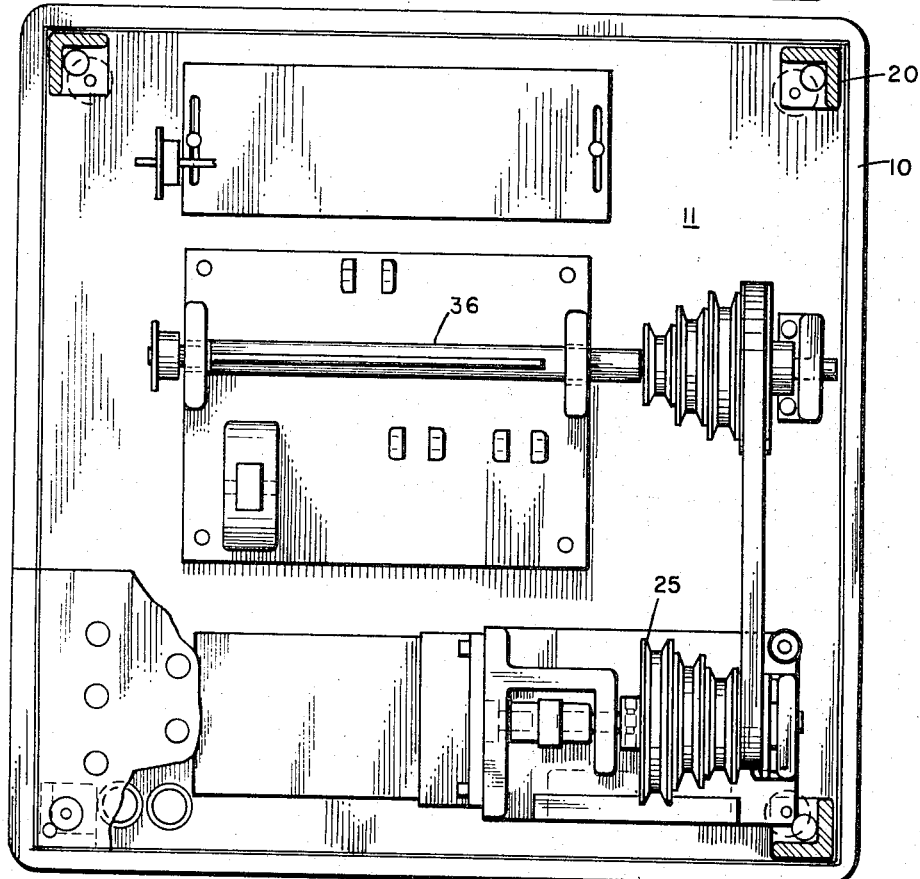
FIG. 3 is a top view of the machine with certain parts removed for better understanding.
Figure 5:
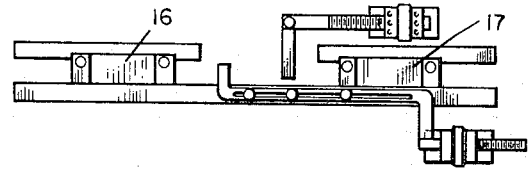
FIG. 5 is an enlarged view of the cam mechanism for moving the nylon blocks which support the chucks toward and away from each other.
Figure 6:
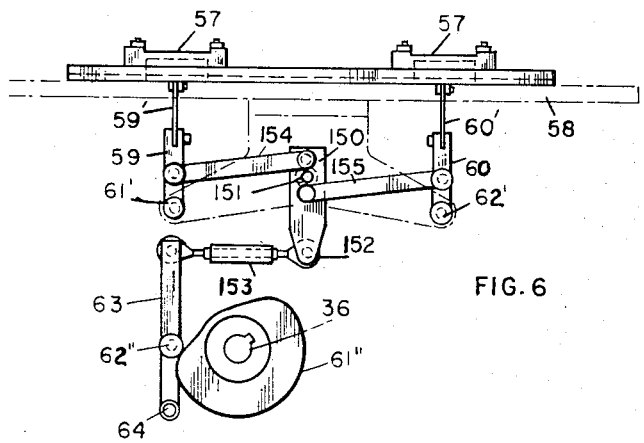
FIG. 6 is a side view of the mechanism shown in FIG. 5.
Figure 6A:
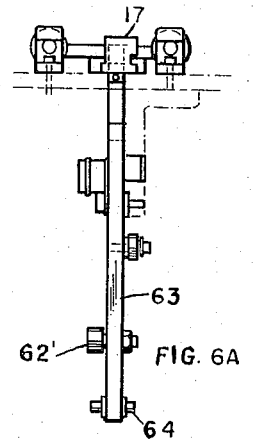
FIG. 6A is an end view of the mechanism shown in FIG. 6.

Now with more specific reference to the drawings, the machine shown has a frame 10 which supports the various components of the machine. The frame 10 has a lower base plate 11 and an upper base plate 12 which are held in spaced relation to each other by means of spacers 20, thereby providing a rigid form for supporting the various components of the machine.

Basically, the machine is made up of the chucking arrangement, including chucks 22 which hold the resistor therebetween and are rotated by means of a drive motor 33.

The device for actually cutting the spiral in the resistor as it rotates is best shown in FIG. 14 and is much similar to a tool post grinder familiar to those familiar with lathes.

The entire function of the machine is actuated by means of three motors which are a main drive motor 19, a chuck drive motor 33, and a cutter motor 30. The only other electrical components are a solenoid 21 which pulls the cutter wheel rapidly out of contact with the resistor and the measuring circuits which actuate the solenoid 21 when the resistor has reached the correct value.

The feeder which feeds the resistors is indicated at 37. The loader is supported on the machine frame by means of a support mount 41'. The feeder has laterally spaced plates 38 and 39 which are held apart by spacers 40 and the plates 38 and 39 are each divided into a front half and a rear half defining a track groove 29 therebetween. The resistors which are to be helixed by this machine may be in the form of cylindrical bodies having a wire lead 124 extending from each end thereof. This is a type of resistor familiar to those skilled in the art. This resistor body will slide between the plates 38 and 39 with one wire extending outwardly through each of the track grooves 29.

Figure 10:
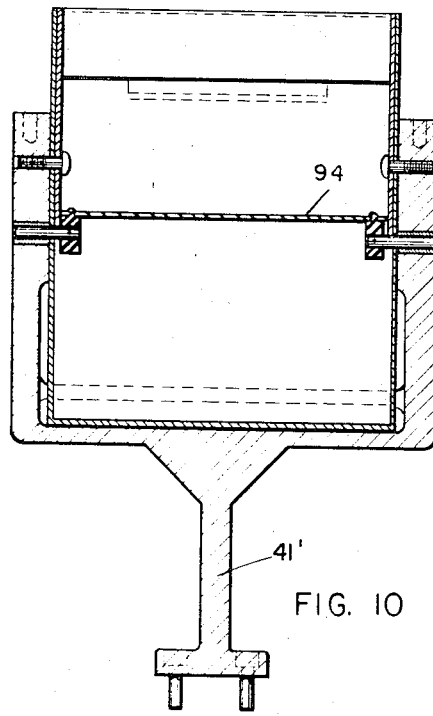
FIG. 10 is a cross sectional view taken on line 10—10 of FIG. 11.
Figure 11:
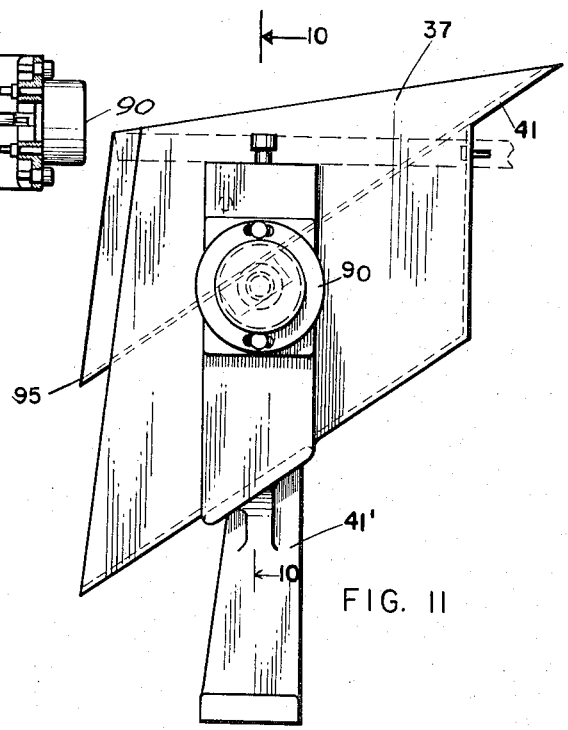
FIG. 11 is a side view of the loading chute.

FIGS. 10 and 11 show the sorting arrangement of the machine. Sorting is accomplished through actuation of the sorting door 94 which is part of chute 37. A solenoid 90 is actuated by a signal from a measuring circuit 83 when a part resistor fails to attain the required accuracy. In this event, the rotary solenoid 90 rotates the door 94 about the shaft of the solenoid to a more vertical attitude, thus causing the rejected resistor to fall into the lower chute and into a "reject" tote box. In the event ta resistor is made to accurate value, a measuring circuit will not yield a signal; the door 94 will remain in the position shown in FIG. 11; and the part will slide out on the upper level of chute 37 past edges 95 into a "good" tote box.

Figures 12, 13:
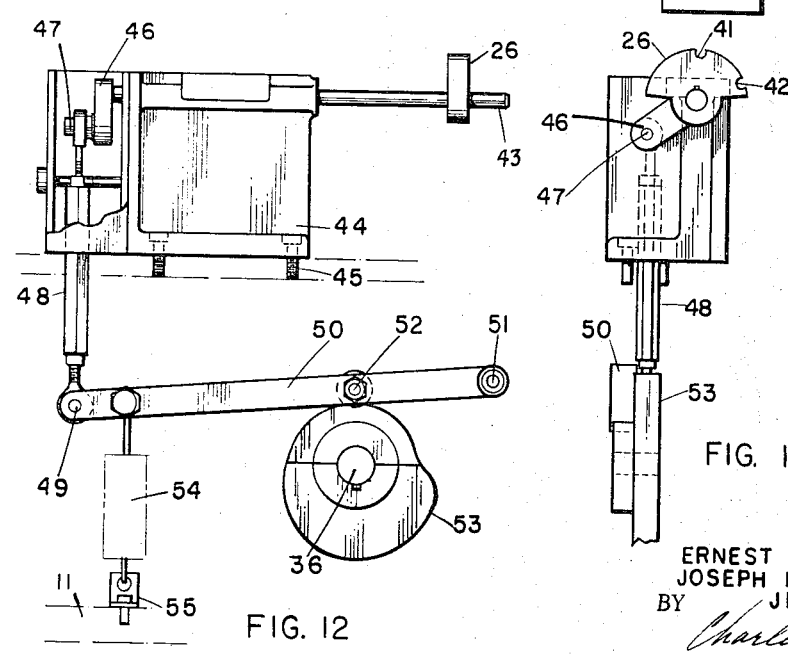
FIG. 12 is an enlarged detailed view of the loading mechanism.
FIG. 13 is an end view of the mechanism shown in FIG. 12.

The resistors from the feeder are transferred from the lower end of the track groove 29 to the space between the chucks by a loader 26 best shown in FIGS. 2, 12, and 13. The loader 26 is in the form of a circular sector of a disk having resistor receiving slots 41 and 42 in its surface. The loader 26 is carried on a loader shaft 43 which is rotatably supported in a bearing member 44 which is supported to the base plate 12 and held in place by locating pins 45. A bellcrank 46 is fixed to the end of the shaft 43 opposite the loader 26 and this bellcrank has its journal 47 connected by a link 48 which is rotatably received at its lower end on the distal end 49 of lever 50. Lever 50 is swingably fastened to the frame at 51 and has a follower 52 which engages the cam 53 which is supported on shaft 36. The follower 52 is held against the cam 53 by means of a spring 54 which has one end fixed to the machine frame at 55.

In operation, each time the cam shaft 36 makes a complete revolution, one complete cycle of the machine is accomplished. The cam 53 moves the notch 41 from the loader to the chuck to carry a resistor from the loader to the chuck and moves the previously cycled resistor in the slot 42 of the loader to the eject position. In other words, during each stroke, the loader 26 is receiving a resistor in the notch or slot 41 and transferring it to the chucks 22. At the same time, it is moving a resistor from the previous cycle out of the chucks and to the eject or drop position in notch 42.

*Chuck operation*

The chucks are moved toward and away from each other by the mechanism shown in FIGS. 5, 6, 6A, 7, 8, and 9. The pillow blocks 13, and 15 support the spindle shaft 65. Nylon blocks 16 and 17 are received in carriers 56 and 57 which slide on plate 58 and are urged by levers 59 and 60. The levers 59 and 60 are swingably attached to the machine frame at 61' and 62'. Their upper ends are connected by universal links 59' and 60' to the carriers 56 and 57. This makes it possible for the carriers to swing around the spindle shafts 65 as will be later explained. Link 150 is swingably connected to the machine frame at 151 and its lower end is connected at 152 to link 153 and thence to link 63. The links 154 and 155 connect the link 150 to levers 59 and 60.

The chucks 22 which are carried by the nylon blocks 16 and 17 are moved toward and away from each other as the cam 61" rotates with its cam surface in engagement with follower 62". The follower 62" is carried on the lever 63 which is swingably attached to the frame 10 at 64. The chucks 22 have tapered axial internal cavities 22' as shown in FIG. 19.

The end of the wire lead 124 is led by the funnel into the chuck cavities 22'. These cavities 22' receive the ends of the resistors. It will be noted that the lead 124 enters the cavities 22' and this engages an ejector pin 322 which is freely slidable in the cavities. The ejector pin has a nylon cap 422 thereon which is engaged by an arm 512. The arm 512 is attached to the forward end of the nylon blocks 16 and 17 and this forces the ejector pin to drive the resistor lead 124 out of the cavity and thereby unload the resistor from the chucks when the chucks part. The funnel shaped cavities 22' insure that the leads will follow into the chucks during loading.

The sliding funnel collar 122 is slidably received on the end of the chuck 22. The collar is held against rotation by anti-rotation pin 130. As the spindle housing moves forward, the funnel collar 122 is moved with it by spring 127 until the end of the wire lead 124 is led by the funnel into the chuck. The funnel then encounters the nylon stop 422 and ceases its inward movement. The chuck 22, however, continues inwardly until it grips the ends of the resistor caps. This retraction of the funnels is necessary in order to permit the cutter to reach the extremes of the resistor length since the cutter must approach the resistor on an angular path.

Since the cavities 22 are tapered, they will accommodate a number of sizes of cylindrical resistors. The chucks 22 are rotated by means of the motor 33 which drives the shaft 65 through belt 23. The shaft 65 drives the chucks through the gears 66, one of which is non-metallic. The sensing fingers 67 and 68 are electrically insulated from the remainder of the machine by the nylon blocks 16 and 17 and they are connected to the resistor through the chucks for controlling the resistance of the resistors.

*Spindle pullout assembly*

Figure 18:
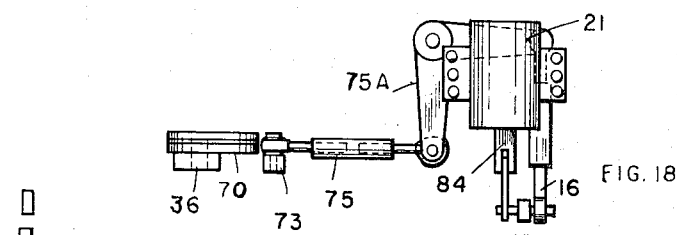
FIG. 18 is a top view of the spindle pullout assembly.
Figure 17:
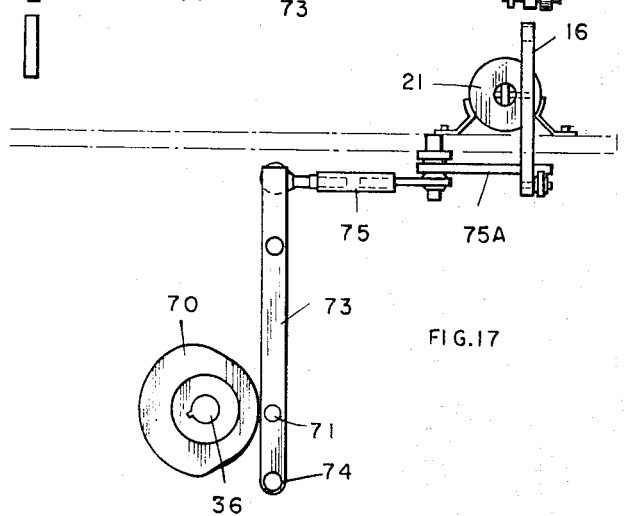
FIG. 17 is an end view of the spindle pullout assembly shown in FIG. 15.
Figure 16:
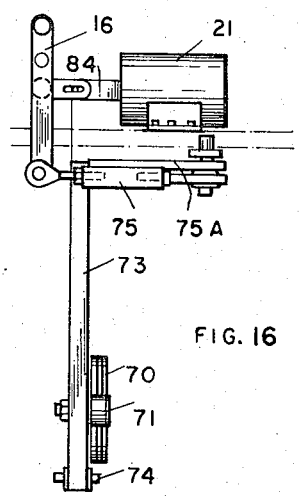
FIG. 16 is a view of the spindle pullout assembly.

The spindle pullout assembly is shown in FIGS. 17 and 18. The function of the spindle pullout assembly is to support the resistor body in engagement with the cutter wheel during the time that a groove is being formed to the precise length and to move the resistor out of contact with the wheel at exactly the correct instant.

This is accomplished by a sensing mechanism which senses the exact instant to retract the resistor. This sensing mechanism actuates the solenoid 21 and causes it to exert a force on block 16 and thence on rod 75 the instant the correct resistance value is reached. Cam 70 then swings links 73 about its point 74 and moves link 75 and through bellcrank 75A swings the cutter wheel about spindle shaft 65.

Cutter wheel assembly

The cutter wheel assembly is best shown in FIGS. 14 and 15. These figures show the cutter motor 30 which drives the cutter wheel 31 through a belt 32. This device is supported on rod tracks 34 and 34' which perform the function of the ways of a lathe which might carry the tool post grinder to move a cutter such as 31 along a workpiece such as the resistor being spiralled. The resistor will be chucked between chucks 22.

The rod tracks 34 and 34' are supported at their opposite ends by the brackets 35 which are fixed to the machine frame and they allow the cutter 31 with its motor 30 and associated frame mechanism to slide backward and forward and this motion is actuated by means of the cam 75 which acts through the follower arm which is attached to the lever 77 at 78. The lever 77 is swingably attached to the frame at 79 and the follower is urged against the cam 75 by spring 80. The upper end of the arm 77 is connected to link 81 to the carriage 82 of the cutter assembly. Thus, as the shaft 36 rotates, the cutter wheel 31 is moved by the cam 75 along the resistor as the resistor rotates, thus generating a lead on the helix being cut on the resistor. It will be noted that, geometrically, the linkage is one of constant velocity actuated by a constant velocity cam due to sliding pins at 78 and the upper end of the rod 77.

When the proper resistance value has been accomplished as sensed by the measuring circuits through the fingers 68, then the solenoid 21 will be actuated by an electrical signal supplied by the electronic measuring equipment. The measuring device is a conventional Wheatstone bridge type measuring device of a type familiar to those skilled in the art. This sensing mechanism will energize the solenoid 21 and cause it to retract its plunger 84 to urge the nylon blocks and the chucks away from the cutter wheel 31, thus stopping the cutting motion instantaneously before it is possible for the cam mechanism on shaft 36 to overcome inertia and to swing the chucks 22 away from the cutting wheel.

The spindle mechanism is spring loaded by spring 80 (FIG. 19) against the cutter wheel 31 so as to allow the solenoid to pull the chucks away from the cutter a sufficient amount which is only a matter of a few hundredths of an inch in order to disengage the cutter from the resistor.

Operation

It will be assumed that there is a resistor in the spindles being cut at the moment and there is one at the chute bottom ready to be loaded next. The loader 26 is in retracted or back position with the resistor to be processed next in slot 41 of the loader and slot 42 is empty and in the load position. The resistor is cut progressively by wheel 31 until it achieves the required value at which point the following occurs in the sequence given:

(1) The pullout solenoid 21 receives a completion signal and moves the spindle away from the cutter and toward, but not completely over to, load position.

(2) The cutter proceeds to the end of its transverse movement while out of contact and no longer cutting the resistor.

(3) The cam motions now overtake the initial solenoid caused motion in the spindle and put the spindle into load position which puts the completed resistor in slot 42 of the loader.

(4) The cams now cause opening of the chucks.

(5) The cutter returns to the start position.

(6) The loader now indexes forward under the urging of the cams and causes ejection of the piece just completed from slot 42 into the sorting chute. At the same time, slot 41 has advanced the next piece into loading position.

(7) The chucks now close under cam driven power on the new piece.

(8) The spindle then rocks over to "cut" position.

(9) The cutter begins its cutting traverse.

(10) The loader rocks back to retracted position to complete the cycle.

One additional operation, not mentioned above, takes place after completion of the cut and before opening of the chucks. This is a classifying measuring of the piece as to whether it is good or bad. This will cause a signal to be sent out to the reject chute solenoid 90 and will set the door 94 to distribute the piece to the proper bin. The machine cycles continuously without interrupting or delaying the rotation of the main shaft 36.

The design and construction of the entire spindle structure (FIG. 8) is based upon achieving the lowest possible moment of inertia about the shaft 65 consistent with the necessary movements, strength, rigidity, etc. so as to cause the spindle to react in its acceleration due to actuation of the solenoid 84 in the swiftest possible manner. In other words, by keeping the mass of the entire structure (FIG. 8) as small as possible, the acceleration of the structure during its solenoid "pullout" motion will attain a maximum according to Newton's law: acceleration= force/mass. This materially contributes to the accuracy of the finished resistor value.

In the electrical sense, too, the spindle design is special, since the chucks were designed to be the only part of the measuring circuit which presents capacitance to ground in the circuit. By limiting the area of the insulated part of the spindle system to only the chucks 22 and the pickup fingers 67 and 68, this capacitance effect is minimized, thus again materially aiding the accuracy of the measuring circuit and contributing strongly to the accuracy of the finished resistor.

Recently, the demand for increased accuracy in resistor tolerance control has advanced from an average ten percent accuracy to an average of one percent now current. This machine achieves this increase in accuracy through the rigid application of the above principles and can achieve accuracies in the resistors down around one-tenth percent through its unique construction.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A machine for forming helixes on the periphery of cylindrical bodies comprising
   means to rotate said bodies on said machine,
   means on said machine to inscribe helical insiginia in the outer periphery of said cylindrical bodies,
   and means responsive to the electrical properties of said bodies for stopping the path of said bodies when the overall electrical characteristics of said bodies have reached a predetermined value,
   said means for rotating said bodies comprises collet members receiving the ends of said bodies and adapted to receive wires attached to the ends of said bodies extending generally parallel to said bodies,
   and means on said collet members engaging said wires for ejecting said bodies from said collet members.

2. A machine for forming helixes on the periphery of cylindrical bodies comprising
   means to rotate said bodies on said machine,
   means on said machine to inscribe helical insignia in the outer periphery of said cylindrical bodies,
   means responsive to the electrical properties of said bodies for stopping the path of said bodies when the overall electrical characteristics of said bodies have reached a predetermined value, said means to rotate said bodies comprises collets having generally frusto-conical cavities therein, axially extending openings in said collets extending generally parallel to the axes of rotation of said bodies.

and ejector means for engaging wires attached to the ends of said bodies for ejecting them from said collets.

3. The machine recited in claim 2 wherein said machine has means thereon for handling resistors having end caps and an intermediate part, and loading means engaging said end caps but not engaging the intermediate parts of said bodies between said end caps.

4. The machine recited in claim 2 wherein said machine has means thereon for varying the pitch of spirals on said bodies.

References Cited

UNITED STATES PATENTS

| | | | |
|---|---|---|---|
| 1,635,184 | 7/1927 | Jones | 338—233 |
| 2,884,746 | 5/1959 | Rus et al. | 51—50 X |
| 3,105,288 | 10/1963 | Johnson et al. | 90—11.62 X |
| 3,138,065 | 6/1964 | Owens et al. | 51—50 X |
| 3,182,426 | 5/1965 | Vrsecky | 51—95 |
| 3,190,043 | 6/1965 | Koumans et al. | 51—50 X |
| 3,203,137 | 8/1965 | Owens et al. | 51—50 |

LESTER M. SWINGLE, *Primary Examiner.*